(12) United States Patent
Ottnad et al.

(10) Patent No.: US 11,294,358 B2
(45) Date of Patent: Apr. 5, 2022

(54) INDOOR LOCATION SYSTEM WITH ENERGY CONSUMPTION CONTROLLED MOBILE TRANSCEIVER UNITS

(71) Applicant: TRUMPF Werkzeugmaschinen GmbH + Co. KG, Ditzingen (DE)

(72) Inventors: Jens Ottnad, Karlsruhe (DE); Manuel Kiefer, Sinsheim (DE); Korbinian Weiss, Korntal (DE); Benjamin Schwarz, Muenchingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 243 days.

(21) Appl. No.: 16/809,627

(22) Filed: Mar. 5, 2020

(65) Prior Publication Data

US 2020/0218237 A1    Jul. 9, 2020

Related U.S. Application Data

(63) Continuation of application No. PCT/EP2018/072863, filed on Aug. 24, 2018.

(30) Foreign Application Priority Data

Sep. 5, 2017 (DE) .......................... 102017120378.8
Apr. 26, 2018 (DE) .......................... 102018110150.3

(51) Int. Cl.
*G05B 19/418* (2006.01)
*H04W 4/80* (2018.01)

(52) U.S. Cl.
CPC ................... *G05B 19/4183* (2013.01); *G05B 2219/31328* (2013.01); *G05B 2219/33192* (2013.01);

(Continued)

(58) Field of Classification Search
CPC ...... G05B 19/4183; G05B 2219/31328; G05B 2219/33192; G05B 2219/34306;

(Continued)

(56) References Cited

U.S. PATENT DOCUMENTS

2003/0150908 A1    8/2003   Pokorny et al.
2007/0293952 A1    12/2007  Callaghan et al.
(Continued)

FOREIGN PATENT DOCUMENTS

DE    4306209 A1    9/1994
DE    10248142 B3   7/2004
(Continued)

OTHER PUBLICATIONS

PCT International Preliminary Report on Patentability in International Appln. No. PCT/EP2018/072863, dated Mar. 10, 2020, 16 pages (with English translation).

(Continued)

Primary Examiner — Charles R Kasenge
(74) Attorney, Agent, or Firm — Fish & Richardson P.C.

(57) ABSTRACT

An indoor location system includes mobile transceiver units to support a manufacturing control of process courses in an industrial manufacturing of workpieces in a manufacturing plant. The indoor location system includes an analysis unit configured to determine a position of a mobile transceiver unit to be localized from runtimes of electromagnetic signals between transceiver units, and an energy consumption control unit configured to output a control signal for deactivating a localizing mode of a position signal module of at least one of the mobile transceiver units if participation of the at least one mobile transceiver unit in position determination operations is not required and to output a control signal for activating the localizing mode of the position signal module of the at least one of the mobile transceiver units from a (Continued)

deactivated state when participation of the at least one mobile transceiver unit in a position determination operation is required.

22 Claims, 3 Drawing Sheets

(52) U.S. Cl.
CPC ........... *G05B 2219/34306* (2013.01); *G05B 2219/40544* (2013.01); *H04W 4/80* (2018.02)

(58) Field of Classification Search
CPC ........... G05B 2219/40544; G05B 2219/31006; G05B 2219/31034; G05B 2219/40543; H04W 4/80; Y02P 70/10; Y02P 90/02
See application file for complete search history.

(56) References Cited

U.S. PATENT DOCUMENTS

| | | | |
|---|---|---|---|
| 2011/0045763 A1 | 2/2011 | Mohanty et al. | |
| 2015/0119077 A1 | 4/2015 | Bucheim et al. | |
| 2015/0356332 A1 | 12/2015 | Turner et al. | |
| 2016/0100289 A1 | 4/2016 | Mayorchik et al. | |
| 2016/0363663 A1* | 12/2016 | Mindell | G01S 13/79 |
| 2017/0039516 A1* | 2/2017 | Amann | H04B 17/318 |
| 2017/0039517 A1* | 2/2017 | Amann | H04W 4/023 |
| 2017/0064667 A1 | 3/2017 | Mycek et al. | |
| 2017/0075346 A1 | 3/2017 | Oya et al. | |
| 2018/0099643 A1 | 4/2018 | Golsch et al. | |
| 2018/0239010 A1* | 8/2018 | Mindell | G01S 13/82 |
| 2019/0240703 A1 | 8/2019 | Kiefer et al. | |
| 2019/0243343 A1 | 8/2019 | Kiefer et al. | |
| 2020/0002182 A1 | 7/2020 | Kiefer et al. | |
| 2020/0208989 A1 | 7/2020 | Ottnad et al. | |

FOREIGN PATENT DOCUMENTS

| | | |
|---|---|---|
| DE | 102010041548 A1 | 3/2012 |
| DE | 102011054360 A1 | 4/2013 |
| DE | 202016106352 U1 | 12/2016 |
| DE | 102016120131 A1 | 4/2018 |
| DE | 102016120132 A1 | 4/2018 |
| DE | 102016220015 A1 | 4/2018 |
| DE | 102017107357 A1 | 4/2018 |
| DE | 102017120382 B3 | 10/2018 |
| DE | 102017120378 A1 | 3/2019 |
| DE | 102017120381 A1 | 3/2019 |
| DE | 102017120383 A1 | 3/2019 |
| EP | 2963953 A1 | 1/2016 |
| EP | 3118702 A1 | 1/2017 |
| GB | 2513956 A | 11/2014 |
| WO | WO 2013/053569 A1 | 4/2013 |
| WO | WO 2018/069314 A1 | 4/2018 |
| WO | WO 2019/048152 A1 | 3/2019 |
| WO | WO 2019/048153 A1 | 3/2019 |

OTHER PUBLICATIONS

DE Office Action in German Appln. No. 102017120381.8, dated Jul. 5, 2018, 6 pages.
DE Office Action in German Appln. No. 102017120382.6, dated May 2, 2018, 3 pages.
DE Office Action in German Appln. No. 102018110150.3, dated Jan. 24, 2019, 4 pages.
Kritz et al., "Improving Indoor Localization Using Bluetooth Low Energy Beacons," Mobile Information Systems, 2016, 11 pages.
Omni-ID, "Omni-TD® View 3 & View 4," 2016, 2 pages.
Omni-ID, "Omni-ID® Power 60," 2016, 2 pages.
PCT International Search Report and Written Opinion in International Appln. No. PCT/EP2018/071163, dated Nov. 12, 2018, 24 pages (with English translation).
PCT International Search Report and Written Opinion in International Appln. No. PCT/EP2018/071164, dated Nov. 12, 2018, 25 pages (with English translation).
PCT International Search Report and Written Opinion in International Appln. No. PCT/EP2018/072863, dated Jan. 2, 2019, 21 pages (with English translation).
Ramakrishnan et al., "Feasibility and Efficacy of BLE Beacon IoT Devixes in Inventory Management at the Shop Floor," International Journal of Electrical & Computer Engineering, Oct. 2016, 6(5):2362-2368.
Swedberg, "Omni-ID's View 10 Tag Aims to Replace Paperwork at Detroit Diesel, Other Factories," RFID Journal, 2014, 3 pages.
Zhong et al., "A two-level advanced production planning and scheduling model for RFID-enabled ubiquitous manufacturing," Advanced Engineering Informatics, Oct. 2015, 29(4):799-812.
Zhong et al., "RFID-enabled real-time manufacturing execution system for mass-customization production," Robotics and Computer-Integrated Manufacturing, Apr. 2013, 29(2):283-292.
Zuehlke, "SmartFactory—Towards a factory-of-things," Annual Reviews in Control, 1(34): 129-138.

* cited by examiner

INDOOR LOCATION SYSTEM WITH ENERGY CONSUMPTION CONTROLLED MOBILE TRANSCEIVER UNITS

CROSS REFERENCE TO RELATED APPLICATIONS

This application is a continuation of and claims priority under 35 U.S.C. § 120 from PCT Application No. PCT/EP2018/072863, filed on Aug. 24, 2018, which claims priority from German Application No. 10 2017 120 378.8, filed on Sep. 5, 2017, and German Application No. 10 2018 110 150.3, filed on Apr. 26, 2018. The entire contents of each of these priority applications are incorporated herein by reference.

TECHNICAL FIELD

The present disclosure relates to an indoor location system for supporting the manufacturing control of process courses in the industrial manufacturing of workpieces in a manufacturing plant, in particular in metal and/or sheet metal processing. Furthermore, the present disclosure relates to a manufacturing control system with such an indoor location system as well as a method for the manufacturing control of process courses in the industrial processing of workpieces, in particular in metal and/or sheet metal processing, supported by an indoor location system.

BACKGROUND

Representative for the metal processing industry, many parts of different sizes are often fed to different processing steps in industrial metal and/or sheet metal processing. For example, workpieces, such as laser cut materials or punched sheet metal parts, are sorted at a workplace with a machine tool and fed to further processing steps. After the processing, cut or punched workpieces are often made available to the respective downstream production step in a group. Thereby, mobile transceiver units can be assigned to the workpieces in order to track them spatially during the various processing steps. If the mobile transceiver units are active, i.e., they participate in operations for detecting a position, they require energy. In general, a low power consumption of the transceiver units is advantageous. For example, different processing steps can take different lengths of time, during which time a group of workpieces can be regarded as quasi stationary. Furthermore, time windows of varying lengths may extend between successive process courses.

The integration of an indoor localization, which can be used within a manufacturing hall, can facilitate the monitoring and control of processing steps. For example, from DE 10 2016 120 132 A1 ("Werkstücksammelstelleneinheit und Verfahren zur Unterstützung der Bearbeitung von Werkstücken") and DE 10 2016 120 131 A2 ("Absortierunterstützungsverfahren und Flachbettwerkzeugmaschine"), methods to support the sorting process of workpieces produced with a flatbed machine tool, generally methods to support the processing of workpieces, are known. Furthermore, a supporting method for the sorting of e.g., cut material of a flatbed machine tool is known from DE 10 2017 107 357 A1 "Absortierunterstützungsverfahren und Flachbettwerkzeugmaschine". From the German patent application DE 10 2017 120 381.8 ("Assistiertes Zuordnen eines Werkstücks zu einer Mobileinheit eines Innenraum-Ortungssystems") with a filing date of Sep. 5, 2017, a digital and physical assignment of mobile units, orders and workpieces is also known. Further aspects of the use of an indoor localization are described in the German patent application DE 10 2017 120 378.8 ("Innenraum-Ortung-basierte Steuerung von Fertigungsprozessen in der metallverarbeitenden Industrie") with a filing date of Sep. 5, 2017. The mentioned German patent applications are incorporated herein in their entirety.

An example of indoor localization is known from US 2016/0100289 A1, which describes a localization and tracking system for determining the positions of mobile wireless devices, for example using "Ultra Wide Band" (UWB) technology. Thereby, the positions of the mobile devices are obtained by calculating differences in arrival times. Motion sensors based on UWB technology, which inter alia can be extended with acceleration sensors, are disclosed according to US 2015/0356332 A1 for example for performance analysis in sports.

SUMMARY

One aspect of the present disclosure is based on the objective of proposing systems that are reduced in their energy consumption especially in the field of metal and/or sheet metal processing. Another objective is to be able to support production processes intelligently as long as possible and without interruption of charging processes with mobile transceiver units.

At least one of these objectives is solved by an indoor location system according to one or more implementations of the present disclosure, by a manufacturing control system according to one or more implementations of the present disclosure, and a method for energy-optimized manufacturing control of process courses in the industrial processing of workpieces according to one or more implementations of the present disclosure.

In one aspect, an indoor location system for supporting manufacturing control of process courses in the industrial manufacturing of workpieces in a manufacturing plant, especially in metal and/or sheet metal processing, includes multiple mobile transceiver units (or mobile transceiver devices or mobile transceivers). Within the framework of process courses (in the industrial manufacturing of workpieces), these mobile transceiver units can each be spatially assigned one object from a group of objects that can perform independent or driven movements in space such that the position of a mobile transceiver unit represents location information for the assigned object. Each of the mobile transceiver units has a position signal module. The position signal module is configured to operate in a localizing mode for receiving, processing, generating, and transmitting electromagnetic signals to determine the position of a mobile transceiver unit to be localized of the mobile transceiver units (in three-dimensional space). The term "localized" in the present disclosure indicates that a location is determined, such as a location within the plant. The terms "localized" and "located" can be used interchangeably herein.

The indoor location system also has an analysis unit (or analyzer). This analysis unit is configured to determine the position of the mobile transceiver unit to be localized in a positioning process from the runtimes of the electromagnetic signals between transceiver units (which are operated in localizing mode). This allows tracking a movement of a target object from the group of objects to which the mobile transceiver unit to be localized is assigned. In particular, runtimes between the mobile transceiver unit to be localized and (other) mobile transceiver units and/or between the mobile transceiver unit to be localized and stationary transceiver units can be used for position determination.

The indoor location system also has an energy consumption control unit (or energy consumption controller). This energy consumption control unit is configured to output a control signal for deactivating the localizing mode of the position signal module of at least one of the mobile transceiver units, in particular if participation of the at least one mobile transceiver unit in position determination operations is not required. This allows in particular to reduce the energy consumption of the at least one of the mobile transceiver units. The energy consumption control unit is further configured to output a control signal for activating the localizing mode of the position signal module of the at least one of the mobile transceiver units from the deactivated state when the analyzing unit requests participation of the at least one mobile transceiver unit in a position determination operation. The terms "energy consumption" and "power consumption" can be used interchangeably herein.

In another aspect, a manufacturing control system for controlling manufacturing processes in a production facility is disclosed. This manufacturing control system can be used in particular in a metal and/or sheet metal processing industrial manufacturing plant. The manufacturing control system includes an indoor location system as described above, which is configured as part of the manufacturing control system to provide data on the position of a mobile transceiver unit to be localized in the manufacturing plant, in particular in a manufacturing hall. The manufacturing control system is further configured to assign the position obtained by the mobile transceiver unit to be localized to at least one object and to include it in the manufacturing control, in particular in the control of process courses in the industrial processing of workpieces. Position determination operations are carried out with the indoor location system and the operation of the mobile transceiver unit is controlled with the energy consumption control unit.

In a further aspect, a method for the (especially energy-controlled) manufacturing control of process courses in the industrial processing of workpieces for the manufacture of end products is disclosed the manufacturing control being supported by an indoor localization. This is particularly applicable in metal and/or sheet metal processing. The method includes the following steps:

providing a plurality of mobile transceiver units, to each of which one object out of a group of objects is spatially assigned within the framework of process courses. The objects can execute movements in three-dimensional space in one or more dimensions, either independently or driven. Based on the assignment, the position of a mobile transceiver unit represents location information for the assigned object. Each of the mobile transceiver units has a position signal module which can be operated in a localizing mode for transmitting and receiving electromagnetic signals for determining the position of at least one of the mobile transceiver units (in three-dimensional space).

deactivating the localizing mode of the position signal module of at least one of the mobile transceiver units when participation of the at least one mobile transceiver unit in position determination operations is not required. The energy consumption of at least one of the mobile transceiver units can be reduced accordingly.

activating the localizing mode of the position signal module of the at least one of the mobile transceiver units from the deactivated state when a position determination operation requires the participation of the at least one mobile transceiver unit.

Further advantages of aspects disclosed herein relate to the easier, energy-saving integration of an indoor localization based on mobile transceiver units into manufacturing processes.

In some embodiments, the processing of the workpiece or workpieces is performed at workplaces with automated or fully automated machines. These are networked with or integrated into the manufacturing control. Workplaces that are only networked to a very small degree can be, for example, manual workplaces (manual workstations) with simple machines, such as workplaces for drilling, sawing, milling and bending.

Based on the concepts disclosed herein, intelligent assistance systems in manufacturing halls can use 2D or 3D position determination of workpieces (generally material) and persons (e.g., operators), transport media, machines, tools, and much more to support manufacturing processes. This makes it possible to use 2D or 3D positions as information in the context of a holistic manufacturing control and digitization of factories, where the information may be available in addition to further sensor information and was determined according to the concepts disclosed herein. Such indoor location systems allow the detailed mapping of material flows in manufacturing within a manufacturing hall into digital processing of a process. Location systems simplify the localization of objects/persons, which participate at the manufacturing, in the production environment. Thus, time-consuming searches for workpieces, tools or persons can be reduced by the indoor location system.

The concepts disclosed herein are based on the use of a 2D/3D indoor location system as a starting point for location-based information processing. The indoor location system continuously transmits position data of mobile units to be localized to the manufacturing control system herein also referred to as MES (Manufacturing Execution System) when operated in a localizing mode.

With the methods disclosed herein, indoor position determination can be carried out with an accuracy of less than 30 cm, in particular less than 10 cm, in a manufacturing hall not accessible by GPS satellite signals with a floor plan in the range of e.g., 1 ha. In industrial manufacturing, the aim is a localization in real time. Localization should be precise enough in terms of location to ensure that units to be localized can be reliably found and/or assigned to the processing steps. The tracking system should also be flexible and easy to use.

DESCRIPTION OF DRAWINGS

Herein, concepts are disclosed that allow at least partly to improve aspects of the prior art. In particular additional features and their usefulness result from the following description of embodiments on the basis of the drawings. The drawings show.

DETAILED DESCRIPTION

Figure 1:
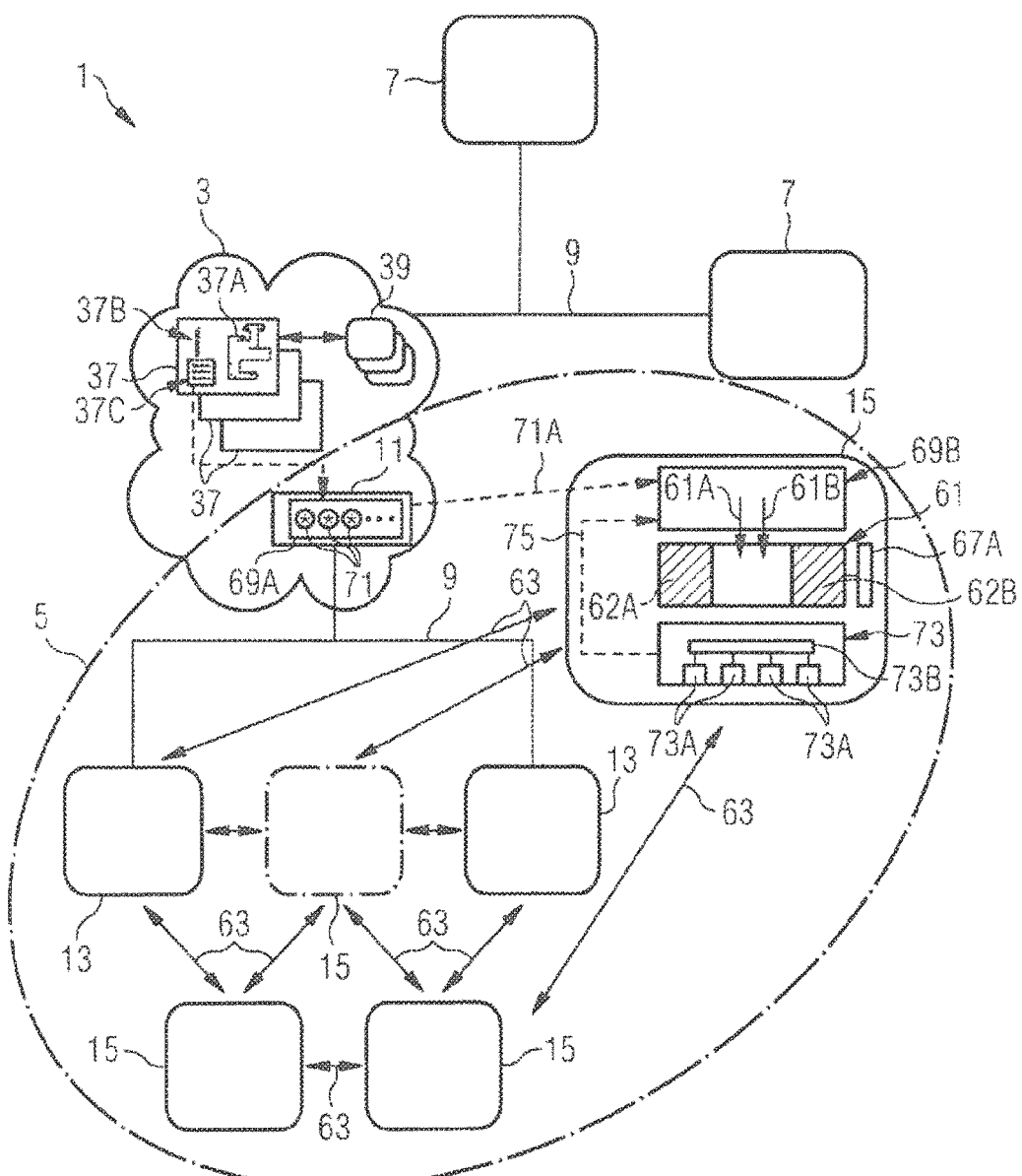
FIG. 1 shows an exemplary schematic representation of a manufacturing control system with an indoor location system.

The aspects described herein are based in part on the recognition that energy management can be a critical success factor for indoor location systems. Cumbersome cabling or too frequent charging cycles reduce the manageability of the indoor location systems and question their economic efficiency. This applies in particular to mobile components.

Indoor location systems can be based on different technologies. These include inter alia: Ultra Wide Band (UWB) location systems, Bluetooth Low Energy (BLE) location systems, and WLAN-based location systems. Some technologies determine the position of mobile transceiver units in space based on field strength measurement and triangulation. Other technologies use runtime methods to determine the position of mobile units. The methods can differ in terms of accuracy, robustness, and power consumption.

As described herein, various methods can be used together, making use of their specific properties for energy-optimized operation of mobile transceiver units. In the following, essential features for exemplary location systems are summarized:

- GPS-based location systems are based on a technology that works outside buildings with wide coverage worldwide and without additional transceiver units.
- UWB-based location systems are energy-efficient when it comes to sending information and allow very precise positioning through runtime procedures. They require the availability of multiple transceiver units and are usually only used in buildings.
- BLE-based location systems enable low-energy listening to signals. However, field strength-based localization is inaccurate and requires the installation of local transmitters (anchors/satellites).

In the present disclosure, if the technologies described above are used together in a location system, the following can be made possible:

- a low-energy transmission (UWB),
- low energy listening (BLE),
- an indoor and worldwide available localization (UWB & GPS), and
- a very precise localization (UWB).

If one restricts oneself to indoor localization, the advantages can also be realized by the combined use of a UWB-based location system and a BLE-based location system.

If one looks specifically at energy consumption, one also sees that, in addition to the type of technology used, it is essentially the operating mode that determines energy consumption. A mobile transceiver unit in localizing mode consumes many times (often more than 1000 times) as much energy as a mobile transceiver unit in stand-by mode (sleep mode). Furthermore, the frequency of communication between the mobile transceiver unit to be localized and other transceiver units determines the energy consumption.

The concepts disclosed herein use inter alia the definition of geometric spaces (geofences) in order to control the interaction pattern and thus the energy consumption in a process-specific way and to reduce the energy consumption during communication. If, for example, a mobile transceiver unit to be localized enters the area of a warehouse, no change of position is expected for a longer period of time. The mobile transceiver unit can switch to sleep mode. When the mobile transceiver unit is in sleep mode, the UWB tracking system can be switched off completely or partially or put into energy-saving modes. Only a BLE communication system that forms part of a location system, for example, remains active to listen for a signal to wake up. In sleep mode, the mobile transceiver unit can remain in a warehouse for months without significant energy consumption.

However, if the mobile transceiver unit to be localized is located in the vicinity of a manual workstation, for example, and is used there to track the movement of a worker, for example, a high scanning rate of the position is required to achieve sufficient data density. If the mobile transceiver unit to be localized leaves the manufacturing plant and is loaded, for example, onto a transport device such as a truck or train, the mobile transceiver unit to be tracked loses contact with the UWB location system and activates the GPS location system until the next contact with a UWB location system, the UWB location system being set up with e.g., a BLE system.

A transceiver unit of a BLE or UWB system provided in the transport device can register the mere presence of the mobile transceiver unit to be localized and establish the assignment to the transport device. Thereby, the localization can be done by the GPS location system of the transport device during transport.

It should be mentioned that a human-readable display of a mobile transceiver unit is another component of the mobile transceiver unit that typically requires energy. Low-energy operation can be achieved here, for example, by using an E-Ink display, in which the information on the display is retained even if energy is lost. Just by changing the display content, the E-Ink display consumes energy to reverse the polarity of the individual pixels. This ensures robustness against a missing connection or hardware defects in the mobile transceiver unit. Manufacturing can be maintained temporarily without active electronics until the mobile transceiver unit is repaired/replaced.

To optimize energy consumption, it is possible to combine different location systems and integrate different sensor systems. Sensors can be made available everywhere or be part of the mobile transceiver unit, but they are only activated when required.

For example, one or more of the following sensors/modules can be provided on the mobile transceiver unit:

- a motion sensor such as an acceleration sensor, gyroscope sensor, or magnetic field sensor (earth magnetic field). Motion sensors, together with the position data from the location system, allow a more robust and accurate position determination. In addition, motion sensors can form the basis for communication between the worker and the control system by means of gestures ("movement trajectories written in the air"), for example, or targeted vibrations of a sensor.
- an imaging camera for assigning the mobile transceiver unit to, e.g., workpieces, load carriers (transport devices), or workers. The camera can also be used for monitoring the filling level of load carriers.
- a weighing cell for measuring the weight of deposited workpieces or tools.
- an NFC (near-field communication) or RFID (radio-frequency identification) tag for robust and fast wireless communication in the near field.
- a Hall sensor for magnetic field measurement as a basis for a unique identification of sheet metal components by the specific structure of metals.

a device for eddy current measurement as a basis for a unique identification of sheet metal components by the specific structure of metals.

an infrared diode or color LED (light-emitting diode) for signal output.

a Bluetooth low energy module as communication interface.

a temperature sensor and/or a humidity sensor to document manufacturing conditions for specific components or the use of tools or as a sensor for building control.

a smoke detector as a decentralized early warning system in case of fire or in case of a defect of a machine.

a device for recording vital functions, for monitoring the physical condition of a worker and for drawing conclusions about the worker's activity (e.g., pulse, blood pressure, muscle contraction, muscle stretching during actions of the worker).

a brightness sensor to control the illumination of the production facility.

actuators for continuous charging of batteries by "energy harvesting": e.g., solar charging, vibration (piezo) charging, etc.

a vibration sensor to identify interaction with a worker and to identify vibration profiles (documentation of the production environment for specific components) with e.g., subsequent adjustment/optimization of the production environment. Vibration sensors can also be used to detect earthquakes.

Further possible functions and ways of integrating such sensors/modules into the manufacturing control system are described as examples in the applications of the applicant mentioned above.

An evaluation of the sensors in the mobile transceiver unit is particularly targeted and meaningful if it can be placed in the context of the production environment (in stock: partial quantities; during welding and assembly/joining: joining groups; in quality inspection: marking of scrap). The sensors in the mobile transceiver unit output machine-readable information.

In order to be able to map the information exchange with the worker in a process-safe way, a human-readable information interface is necessary. Thus, a display can show a selection of data from a manufacturing control system, which it receives context-based from the manufacturing control system for a corresponding process step. For example, the display can show a subsequent work step (for example, for logistics),
the geometry of a workpiece (e.g., for picking),
component tolerances (e.g., for quality inspection).

When displayed on the screen, display parameters such as size, color, motion, and flashing can be used to emphasize information. In addition, an LED can be installed on the mobile transceiver unit as an exposed element of the human-readable information, for example, which can visually communicate coded information to the human by means of different colors, blinking frequencies or blinking patterns (e.g., to assist in localizing a mobile transceiver unit).

By combining different communication technologies, disadvantages of one technology can be compensated by another technology. For example, low-power transmission with a UWB location system in localizing mode can be combined with low-power listening of the BLE location system in sleep mode of the UWB system. The various operating modes can be dynamically adapted. For example, operating modes can be assigned to specific areas (geofences), or operating modes can be switched on or off when specific measurement results are available from sensors provided in the mobile transceiver unit to be localized. For example, further sensor technology (e.g., acceleration sensors) can be used for detailed recording of the (motion) status of the mobile transceiver unit. If the mobile transceiver unit is at rest in the warehouse, the UWB position determination can be deactivated, for example, until an activation of the position determination is triggered by means of a BLE positioning system.

In this way, for example, small batteries/accumulators can be used in mobile transceiver units. Furthermore, the mobile transceiver units to be localized can be operated with a correspondingly high sampling rate for position determination, but only if precise position determination is really required. This means that longer operating times of the mobile transceiver units can be achieved, charging cycles become less frequent, and cheaper energy sources can be used. In general, the mobile transceiver units to be localized will be used more extensively and for a longer period of time and will be located more precisely.

In connection with the figures, the support of the manufacturing control of process courses in the industrial production of workpieces with mobile transceiver units controlled with regard to energy consumption is explained in the following exemplarily.

FIG. 1 schematically shows a manufacturing control system 1, which comprises an MES (Manufacturing Execution System) 3 and an indoor location system 5 (herein briefly referred to as location system).

In general, the MES 3 is used for the control of process courses/manufacturing steps in the industrial manufacturing of workpieces with manual or automated workstations, e.g., machine tools 7. The MES 3 can, for example, be connected to one or more workstations positioned in a manufacturing hall, in particular machine tools 7, via wireless or wired communication links 9. The MES 3 can receive information about the process courses/manufacturing steps as well as status information of the workstations, especially machine tools 7. The MES 3 can be implemented in a data processing device. This can be a single electronic data processing device (server) or a group of multiple data processing devices (server group/cloud). The data processing equipment or the network can be provided locally in the production plant or can be set up decentral outside.

The location system 5 is configured for indoor position detection of mobile transceiver units 15 (also called mobile units) to be localized. It uses multiple stationary or mobile (i.e., locally mobile), but temporarily stationary transceiver units 13, 15 and interacts with the MES 3 with regard to manufacturing control. Mobile transceiver units 15 to be localized are localized via transceiver units 13 by means of runtime analysis. Stationary transceiver units 13 are usually fixed to the hall ceiling, hall walls, workplaces, especially machine tools 7, storage structures etc. The positions of these stationary transceiver units 13 are stored, for example, in a digital site plan of the manufacturing hall (see also FIG. 4). Mobile transceiver units whose positions are known and which are temporarily stationary can be used as quasi stationary transceiver units.

With the help of the UWB technology mentioned at the beginning, the position can be determined with an accuracy of less than 30 cm, for example, even in a manufacturing hall that cannot be reached by GPS satellite signals. For locally increased accuracy, an increased density of transceiver units 13 can be provided in individual areas for a more precise localization.

The indoor location system 5 also has an analysis unit 11, which is configured to determine the runtimes of electromagnetic signals between the transceiver units 13, 15, and the mobile transceiver unit 15 to be localized. The analysis unit 11 derives the position of the mobile transceiver unit 15 in the manufacturing hall from the runtimes and makes the data on the position of the mobile transceiver unit 15 (position data) available to the MES 3. For example, the analysis unit 11 can be configured as a part of the MES 3, in which the measured positions are compared with data sets also available in the MES 3. The indoor location system is characterized by the fact that the position of the mobile transceiver units can be determined by the analysis unit alone, i.e., without manual interaction.

The transceiver units 13, 15 can be configured, for example, to send UWB radio signals to the mobile transceiver units to be localized and to receive UWB radio signals from them. If one determines distances from a mobile transceiver unit to be localized to multiple transceiver units 13, 15 the location of which is known at the time of measurement, the spatial location of the mobile transceiver unit to be localized can be determined in relation to the transceiver units 13, 15, e.g., by triangulation. The distance between a mobile transceiver unit 15 to be localized and a fixedly installed transceiver unit 13, for example, can be determined by the time it takes for the signal to travel the distance between the two units.

For a determination of the runtime, the transceiver units 13, 15 can have highly accurate clocks that can determine the time to a few or even only fractions of nanoseconds (ns). Even if the clocks in the transceiver units 13, 15 are highly accurate, the clocks are not necessarily synchronized yet. Different methods of synchronizing clocks or eliminating errors following from the asynchronous clock operation can be used. For example, one of the transceiver units 13, e.g., a master position determination unit, can send a signal at a first time T1 and a second signal at a second time T2. The mobile transceiver unit 15 can know the time difference T2-T1 or it can be transmitted together with the signals so that it can synchronize with the time of the transceiver units 13, 15. Alternatively, the mobile transceiver unit 15 can send two signals at a previously known time interval Ta. In this case, the transceiver unit 13 (or the analysis unit 11) can use its own time measurement with its own clock from the reception of the first signal to the reception of the second signal to determine the synchronization deviation and remove it from the distance measurement. The time interval between the first signal and the second signal should be short, so that the mobile transceiver unit to be localized has not moved significantly during this time. The time interval can be selected by the mobile transceiver unit to be a predetermined multiple or fraction of the time that the mobile transceiver unit requires from the reception of a signal to which it is to respond until the output of the first signal.

Transceiver units 13 installed at fix positions can also be connected to the analysis unit 11 via wireless or wired communication links. For example, mobile transceiver units 15 can (only) communicate via stationary transceiver units 13. Alternatively or additionally, they can independently communicate with the analysis unit 11/the MES 3 via further communication connections 9 (e.g., a WLAN connection or a BLE connection).

For example, the analysis unit 11 may serve as a central master position determination unit (also referred to herein as "Server"). For example, this defines a communication framework for UWB communication. The communication frame contains inter alia the transmission time of the frame/ the UWB radio signals. In an exemplary implementation of the indoor localization, one of the transceiver units 13 as a master position determination unit transmits the communication frame to the transceiver units for a position detection of a mobile transceiver device to be localized. This communication frame is used for the signal exchange of the position determination procedure between the transceiver units. The position of the stationary transceiver units with respect to the master position determination unit is known to the transceiver units, for example, by querying a central database, so that the transceiver units and the analysis unit 11 know the time offset between transmission and reception of the UWB radio signal over the signal runtime.

After a predetermined time interval, e.g., 100 ms, the master position determination unit transmits a second communication frame which is received by the transceiver units. By recording the time from the beginning of the reception of the first frame to the beginning of the reception of the second frame, the transceiver units know what the master position determination unit understands, for example, exactly under 100 ms. The transceiver units can thus synchronize the frequency of their time determination units with the master position determination unit.

After different, previously configured time intervals (measured from the reception of the second frame) the mobile transceiver units send a response frame. For example, a "tag 1" transmits after 10 ms, a "tag 2" after 20 ms, a "tag 3" after 30 ms, etc. This radio transmission is received by the transceiver units and the exact time of reception with respect to the start of transmission of the second frame of the master position determination unit is transmitted to the analysis unit 11. The analysis unit 11 then determines position data of the position of the mobile transceiver units 15 to be localized, e.g., using trilateration methods, and passes this information on to the MES 3.

Using the exemplary analysis of runtimes and trilateration described above, the indoor location system 5 can detect the position of one or more mobile transceiver units 15 via the transceiver units 13 using UWB technology. The UWB technology uses frequency ranges, e.g., from 3 GHz to 5 GHz, whereas the UWB technology uses a relatively large frequency range for the formation of temporally sharply defined signal characteristics (communication frames). In order to locate an object that emits radio waves as precisely as possible, a signal with very steep edges is required. This means that the signal represents a rectangular signal curve over time rather than a sinusoidal curve. This requires a signal in which multiple sinusoidal signals with different frequencies are superimposed. This is because a signal can be formed from multiple sinusoidal signals with different frequencies, the signal having a steep edge and being approximated to an essentially rectangular shape over time. This means that multiple frequencies from a broadband frequency spectrum must be available to form a signal. Accordingly, UWB technology, which has a broadband frequency spectrum, is particularly suitable for exact localization. The technology and the usable frequency bands of UWB technology are described, for example, in the standard "IEEE 802.15-2015".

Figure 2:
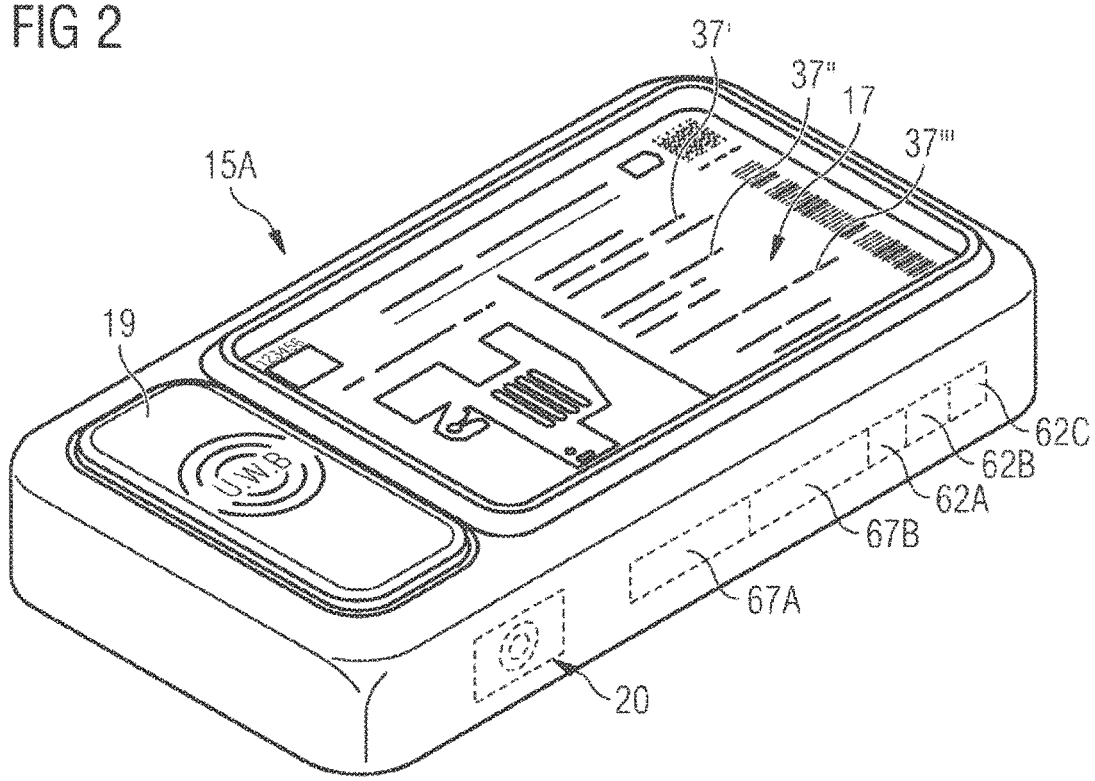
FIG. 2 shows an example of a mobile transceiver unit to be localized by means of UWB.
Figure 3:
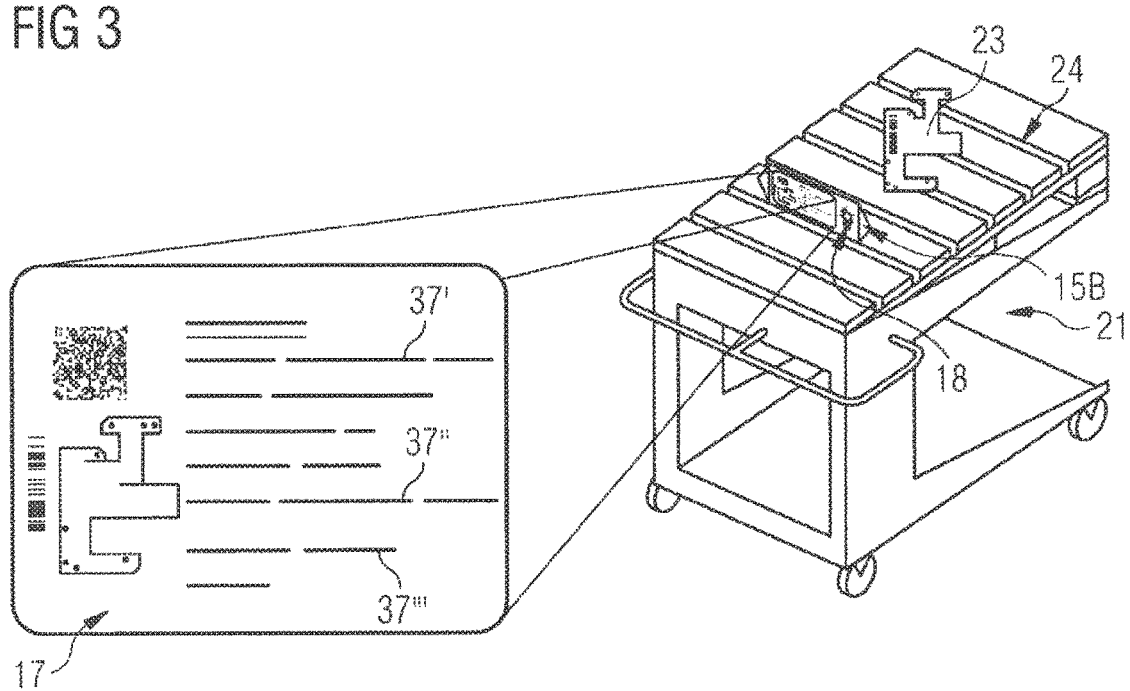
FIG. 3 shows a representation of another exemplary mobile transceiver unit to be localized on a transport carriage for workpieces.

FIGS. 2 and 3 show exemplary mobile transceiver units 15A, 15B. The mobile transceiver units 15A, 15B can be used as independent units in the process course during manufacture. In general, mobile transceiver units can be worn by people in production or can be attached to auxiliary equipment such as transport carriages, machines, and tools to support and/or record operations.

For example, mobile transceiver units can be spatially assigned to one or more workpieces 23, deposited on a depositing area 24 of a transport carriage 21 (see FIG. 3) and then carried along by an operator together with the assigned workpieces 23 from processing step to processing step/from one machine tool 7 to another machine tool 7.

For an interaction of an operator with the mobile transceiver units 15A, 15B, the mobile transceiver units have, for example, an electronically controllable display 17, such as an E-Ink display (also known as electronic paper display). This is used to output, e.g., information on the order, legible for man and/or machine, coded and/or in writing and/or as a figure. For example, the mobile transceiver unit 15B receives information about the number of stored workpieces 23, workpieces still missing, a subsequent processing step, an underlying order (customer), target material, etc., and outputs these on a display 17. The display 17 can also be used as a signal emitting device for feedback to the user. Other examples of signal emitting devices are LEDs and speakers.

Usually the electronics of the mobile transceiver units 15A, 15B are operated with a battery or rechargeable battery.

During manufacture, the mobile transceiver units 15A, 15B represent mobile transceiver units to be localized if their position is to be recorded and processed. Furthermore, if they are temporarily not moved, they can contribute to a position determination process as quasi stationary transceiver units.

A mobile transceiver unit may in its general form have a signal output device 18. This can be a light-emitting device, e.g., an LED, a sound-emitting device, e.g., a signal generator, piezo buzzer, loudspeaker, ultrasonic transmitter, a transmitter for electrical, magnetic, or electromagnetic signals, etc.

A mobile transceiver unit may also, in its general form, include a device for performing tactile movements such as vibrating, tapping, twitching.

A mobile transceiver unit may also, in its general form, include a device for detecting movement such as shaking, bumping, tapping, gesture recognition, e.g., an accelerometer, MEMS or gyrometer.

In addition, a signal input device 19 for entering parameters can be integrated in mobile transceiver units. For example, a user can press a key on the mobile transceiver unit 15 or image a code with a camera 20 of the mobile transceiver unit. The signal input device 19 can generally be a sensor, in particular a light sensor, IR sensor, temperature sensor, pressure sensor, in particular also keys or switches, noise sensor, e.g., microphone or ultrasonic sensor, or sensor for other electrical, magnetic, or electromagnetic signals etc.

As is described in the present disclosure and mentioned at the beginning, the provision of mobile transceiver units in manufacture can be used in many ways.

FIG. 1 also illustrates schematically that processing plans 37 are stored digitally in the manufacturing control system 1, in each processing plan order information for the industrial processing of processing plan-specific workpieces is stored. A processing plan 37 generally includes order information, which is available, for example, in the form of geometry data sets 37A of the workpieces of the order and/or a coding data set 37B identifying the order. Furthermore, the processing plan 37 can include one or more processing and workpiece parameters of the workpieces as well as a digital processing schedule 37C of the order. These data can also be displayed individually, in combination, or all of them on the display 17 of the mobile transceiver unit. In addition, further information 37', 37", 37''' about—e.g., status, material, order, customer, number of parts, manufacturing process steps, in particular the current manufacturing process step and/or the next manufacturing process step, error message, etc. can be displayed.

In addition, FIG. 1 indicates position data sets 39, which were acquired with one or more location systems for the mobile transceiver units 15.

FIG. 1 also shows schematically how the indoor location system 5 can be operated with mobile transceiver units 15, which can be controlled in terms of their energy consumption. The indoor location system 5 includes:

an analysis unit 11, mobile transceiver units 15, each with one position signal module 61, an energy consumption control unit (including, in line with the embodiment of FIG. 1, an energy demand detection module 69A in the analysis unit 11 and an energy consumption control module 69B in a mobile transceiver unit 15), and optional stationary transceiver units 13.

As explained, for example, in connection with FIG. 3, an object (such as a transport carriage or a subgroup of objects such as workpieces of an order) can be spatially assigned to a mobile transceiver unit 15 within the scope of process courses, so that the position of the mobile transceiver unit 15 represents location information for the assigned object. A mobile transceiver unit 15 thereby allows to track the assigned object (the sub-group of objects) when it moves independently or driven in three-dimensional space (in one or more dimensions).

In general, the objects can originate from a group of moving objects, as they given is the case of industrial manufacturing of workpieces in manufacturing plants. The group of objects thus includes, for example, workpieces, means of transport for workpieces, mobile machine tools, a mobile tool, and workers involved in the manufacturing.

The position signal modules 61 of the mobile transceiver units 15 are used for indoor localization. A position signal module 61 is operated in a localizing mode for receiving, processing, generating, and transmitting electromagnetic signals 63, if the associated mobile transceiver unit 15 participates at the determination of the position of at least one of the mobile transceiver units 15 in three-dimensional space in the context of indoor localization. The mobile transceiver unit whose position is to be determined is also referred to herein as the mobile transceiver unit to be localized.

The generation of electromagnetic signals means herein the conversion of electrical power, e.g., from a DC power supply, in particular a battery or accumulator, into electromagnetic signals in the radio frequency range or higher frequencies that are suitable for transmission to other mobile transceiver units (generally for communication).

Processing of electromagnetic signals means herein the analog and/or digital conversion of electromagnetic signals into information that can be stored and/or further processed and can lead to further actions of the mobile transceiver units.

Accordingly, the mobile transceiver units 15 and the stationary transceiver units 13 have electronic circuits and an electrical power supply and may be configured to process data transmitted with the electromagnetic signals.

The analysis unit 11 of the location system is configured to determine the position of a mobile transceiver unit to be localized in a position determination process from runtimes of the electromagnetic signals 63 between the mobile transceiver unit to be localized and other transceiver units. The other transceiver units may include one or more mobile transceiver units which, at least temporarily, are not moving in space for the position determination process. In addition, the other transceiver units may include stationary transceiver units 13, which are permanently installed in the manufacturing hall. The position determination process serves, for example, to follow a target object from the group of objects to which the mobile transceiver unit to be localized is assigned, in its movement within the manufacturing hall.

The energy consumption control unit of the indoor location system 5 is thus configured to control the mobile transceiver units 15 with regard to their energy consumption. In particular, it is configured to output a control signal 61A for deactivating the localizing mode of the position signal module 61 to one of the mobile transceiver units 15. After deactivation of the localizing mode, the position signal module 61 can be in a stand-by mode, for example, or it can be switched off completely. The deactivation reduces the energy consumption of the mobile transceiver unit 15 and is performed in particular when the mobile transceiver unit 15 is temporarily not required to participate in position determination operations.

Thereby the position determination operations may involve determining the position of the mobile transceiver unit 15 whose localizing mode has been deactivated, for example, because the workpieces assigned to the mobile transceiver unit are being temporarily stored for a later processing step. Alternatively, the position determination operations may involve determining the position of another mobile transceiver unit 15, and the mobile transceiver unit 15 whose locate mode has been disabled is, for example, too far away or moving itself and cannot be used for position determination operations.

In addition, the energy consumption control unit of the indoor location system 5 is configured to output a control signal 61B to activate the location mode of the position signal module 61 from the deactivated state when the analysis unit 11 requests the participation of the mobile transceiver unit 15 in a position determination process. The latter is particularly the case if the position of the mobile transceiver unit 15 is to be determined by the user. Alternatively, a contribution to a position determination process can be advantageous if the mobile transceiver unit 15 is located near a mobile transceiver unit to be localized.

In some embodiments, a position signal module 61 is configured as part of a location system based on "Ultra Wide Band (UWB)" technology.

The position signal module 61 is connected to an energy source 67A of the corresponding transmitter-receiver unit 15, from which it receives energy for the operation of the (especially UWB) localizing mode. In particular, the position signal module 61 itself may include the energy source, for example a rechargeable battery.

In addition, a position signal module 61 can have a signal receiving unit 62A, a signal transmitting unit 62B, and an antenna system 62C for receiving and emitting (in particular UWB) signals.

Furthermore, a position signal module 61 can have a signal processing unit 67B that is configured to process received (especially UWB) signals and to cause the emission of (especially UWB) signals and to set time delays between received and transmitted (especially UWB) signals 63.

For example, the energy consumption control unit can be configured as part of a communication system based on "Bluetooth Low Energy (BLE)" radio technology. It includes, for example, BLE transmitter units 71 in the processing facility and BLE receiver units in the transmitter-receiver units and is configured, among other things, to enable communication with low energy consumption on the receiving side and optionally also to enable localization of the BLE receiver unit.

The energy consumption control unit may be generally configured as part of a communication system based on low energy system radio technology, in particular Bluetooth Low Energy (BLE) radio technology. It includes, for example, low-energy system transmitter units 71, in particular BLE transmitter units, which are arranged in the production facility, in particular mounted stationary. Furthermore, the energy consumption control unit comprises low-energy system receiving units, in particular BLE receiving units, which are each arranged in a mobile transceiver unit 15, 15A, 15B.

A communication system based on low-energy system radio technology refers to a communication system that is equipped to work with significantly lower energy requirements than communication systems using conventional radio technology, e.g., UWB communication. The communication system can set a control system or components of a control system (especially mobile units) into a low energy mode in which less computing power is used than during normal operation, e.g., a factor of 10 or 100 less energy is consumed. However, it can quickly return to a normal operating mode, for example within one or a few milliseconds. A radio system of the communication system based on low-energy system radio technology can operate at frequencies between 400 kHz and 5 MHz. It can be configured for a range of a few meters up to a few 10 meters.

In addition, the communication system is configured to also switch the transmitting and/or receiving units on and off and/or to set them to a low energy mode or multiple modes with staggered energy consumption in order to effectively save energy.

One possible mode could be to disconnect the transmitter unit from the power supply completely or to set it in a mode with very low power consumption, so that it can no longer transmit, for example. At the same time, the receiving unit can be kept in a low power consumption mode. In this low power consumption mode, it may be set up to receive signals that can switch a control system or the communication system from a low-energy mode of operation to an energy mode in which it can emit signals again, in particular to the normal operating mode. In such configurations, the communication system based on low-energy system radio technology is able to be woken up via the receiver unit.

In other words, mobile units that are in a low-energy recording mode can be woken up with the low-energy system radio technology. Thereby, the mobile unit can be found easier, for example, if a mobile unit is lost from the operator's field of view.

The low energy system receiving unit of a mobile transceiver unit is configured to have a lower energy requirement than the signal receiving unit 62A of the position signal module 61 of the associated mobile transceiver unit. Typically, Bluetooth Low Energy (BLE) wireless technology, for example, requires less power than Ultra Wide Band (UWB) technology.

In some embodiments, the energy consumption control unit has access to the position data sets of the mobile transceiver units 15 and a digital site plan 25 (see FIG. 4) of the production facility. For example, site plan 25 defines at least one deactivation zone. The energy consumption control unit may be configured to output the control signal for deactivating the localizing mode to those mobile transceiver units 15 for which a position transition from outside the at least one deactivation zone to the at least one deactivation zone is detected.

In some embodiments, the energy consumption control unit has access to a digital operational schedule 37C, which is stored in a processing plan of one of the mobile transceiver units 15. For example, a deactivation time window is defined in operational schedule 37C. The energy consumption control unit may be configured to output the control signal to deactivate the localizing mode to the mobile transceiver units 15 that enter the deactivation time window.

The energy consumption control unit may have an energy demand detection module 69A and energy consumption control modules 69B in the mobile transceiver units. As shown schematically in FIG. 1, the energy demand detection module 69A is arranged/configured in the analysis unit 11. Alternatively, the energy demand detection module 69A can be part of one of the (mobile or stationary) transceiver units 15.

The energy demand detection module 69A is configured to evaluate position information of the mobile transceiver units 15 and/or status information of the mobile transceiver units 15 with regard to a required participation of the mobile transceiver units 15 in a position determination process. In addition, the energy demand detection module 69A includes the transmitter units 71, which are configured to output a switching signal 71A to the energy consumption control module 69B. The switching signal 71A in turn generates the control signals to deactivate or activate the localizing mode of the mobile transceiver unit 15.

In particular, the energy demand detection module 69A can be configured as a transmitter unit of a communication system based on "Bluetooth Low Energy (BLE)" radio technology to output a BLE switching signal. The energy consumption control modules 69B may include receiving units of the communication system based on "Bluetooth Low Energy" radio technology, each of which is configured to receive the BLE switching signal in a mobile transceiver unit.

As indicated exemplarily in FIG. 1, one of the mobile transceiver units 15 can have a sensor module 73. The sensor module 73 can be configured separately or in particular as part of the energy consumption control unit. The sensor module 73 is configured to generate a state signal (or status signal) for output to the energy consumption control unit when a status of the mobile transceiver units 15 is detected in which a position determination of the mobile transceiver units 15 is not required or in which a contribution of the mobile transceiver units 15 to the position determination is not possible.

For example, the sensor module 73 can send a state signal 75 to the energy consumption control module 69B so that the latter then sends the control signal 61A to deactivate the localizing mode. Alternatively, the state signal can be output to the energy demand detection module 69A or the analysis unit, which takes it into account in the evaluation with regard to the operating mode to be set for the mobile transceiver unit 15.

The sensor module 73 may comprise one or more sensors 73A, such as an acceleration sensor, an orientation sensor, a magnetic sensor, a light-sensitive, temperature-sensitive, sound wave-sensitive sensor, a barometer sensor, and/or a sensor for detecting electrical or electromagnetic signals. The sensors 73A can, in particular, be configured as MEMS (micro-electromechanical system)-based sensors and can be connected to a signal evaluation unit 73B of the sensor module 73. The sensor module 73 can, for example, be configured to detect a spatially stationary idle state of the mobile transceiver unit 15, whereby it outputs the state signal 75 after detecting the spatially stationary idle state.

In addition, a mobile transceiver unit 15 may include one or more of the following modules: a Global Positioning System (GPS) module, a load cell module, a temperature sensor module, a humidity sensor module, a brightness sensor module, a vibration sensor module, a Hall sensor module for magnetic field measurement for workpiece identification, an eddy current measurement module for workpiece identification, a vital function sensor module, a near field communication module, a light signal module, a smoke detector module, and/or a display module. These modules can also be deactivated or activated by the energy consumption control unit via control signals to save energy.

Figure 4:
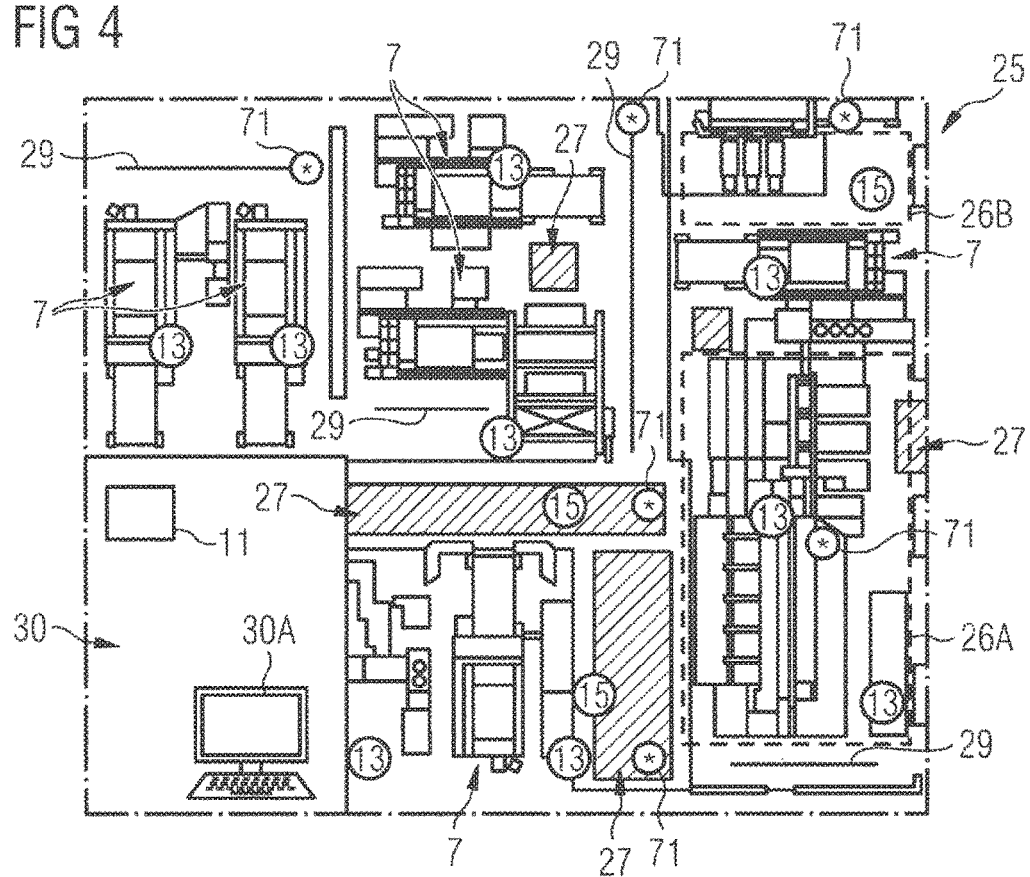
FIG. 4 is an exemplary digital site plan of a manufacturing hall.

FIG. 4 shows a top view of a digital site plan 25 of an exemplary manufacturing hall with multiple work stations and machine tools 7. Examples of machine tools 7 in the metal and metal processing are cutting, especially laser cutting machines, punching machines, grinding machines, bending machines, etc. FIG. 4 shows multiple stationary mounted transceiver units 13 (anchors) and multiple mobile transceiver units 15 at current positions.

The site plan 25 shows an example of a workstation 26A which is networked to a very low degree, such as a manual workstation with simple machines, e.g., for drilling, sawing, milling, bending, which has no networking or only networking via a monitoring system.

Furthermore, FIG. 4 shows a storage area 26B, in which workpieces, transport devices, and mobile transceiver units 15 assigned to them can be temporarily stored for a period of time.

The workstation 26A and the storage area 26B are examples of deactivation zones in which mobile transceiver units prefer to deactivate the localizing mode to save energy.

Furthermore, the site plan 25 shows (virtual—digitally set up) zones 27 and (virtual—digitally set up) gates 29, the zones 27 and the gates 29 have been defined by an operator with regard to the use of machine tools 7 and associated processing courses. The gates 29 extend spatially (e.g., linearly) in the manufacturing hall and define limits, the crossing of which can trigger specific actions by a mobile transceiver unit. Workpiece-specific or object/operator-specific properties can be generally assigned to the zones 27, and the gates 29.

With the UWB location system, the positions of the mobile transceiver units 15 can be displayed on a site map of the site plan 25 and their position in relation to the deactivation zones, the zones 27, and the gates 29 can be used for control purposes when processing workpieces.

When the UWB location system is in UWB localizing mode, comparing the specific position of a mobile transceiver unit with the deactivation zones, the zones 27, and the gates 29 can trigger corresponding actions such as deactivating the UWB localizing mode.

In the area of the deactivation zones, the zones 27, and the gates 29, the manufacturing hall can also be equipped with transmission units 71 of a communication system based on "Bluetooth Low Energy (BLE)" radio technology. The transmitter units 71 are part of the energy consumption control unit and can communicate with BLE receiver units of the mobile transceiver units 15 provided in the energy consumption control modules 69B. In particular, the transmitter units 71 are configured to output switching signals 71A to a energy consumption control module 69B so that the latter generates the control signal 61A for deactivation or the control signal 61B for activation of the localizing mode of the mobile transceiver unit 15.

In a control area 30 shown in the site plan 25, the location of a manufacturing control device of the manufacturing control system 1 is indicated. In the control area 30, there can be the analysis unit 11 and components/control protocols of the energy demand detection module. In the control area 30, there may also be a data processing device 30A (e.g., a personal computer-PC) with a screen (monitor) on which, for example, the digital site plan 25 shown in FIG. 4 is displayed.

Figure 5:
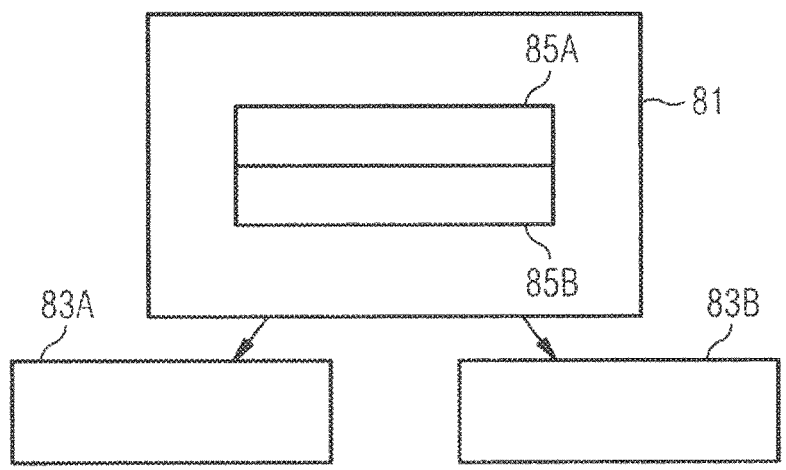
FIG. 5 is a flow chart of exemplary process steps of a method illustrating the energy-optimized operation of mobile transceiver units.

FIG. 5 shows in a flow chart of exemplary process steps of a method to illustrate a manufacturing supported by an indoor location system. The indoor location system can be the indoor location system 5 of FIG. 1.

For the method, an indoor localization as described above is provided. For example, in step 81, multiple mobile transceiver units 15 are provided, to each of which one object from a group of objects is spatially assigned within the framework of process courses. The objects can move independently or can be driven in three-dimensional space in one or more dimensions. Based on a spatial assignment, the position of a mobile transceiver unit represents location information for the assigned object.

Each of the mobile transceiver units includes a position signal module which is operable in a localizing mode for transmitting and receiving electromagnetic signals for determining the position of at least one of the mobile transceiver units in three-dimensional space.

As explained above, if a mobile transceiver unit is not required to participate in position determination operations, in step 83A the localizing mode of the position signal module of the corresponding mobile transceiver unit is deactivated. This allows the energy consumption of at least one of the mobile transceiver units to be reduced.

On the other hand, if a position determination operation requires the participation of a mobile transceiver unit 15, in step 83B the localizing mode of the position signal module of the corresponding mobile transceiver unit activates from the deactivated state.

A further sequence of steps of the method includes, for example:

performing a position determination process (step 85A) in which the position of a mobile transceiver unit to be localized is determined from runtimes of electromagnetic signals between the mobile transceiver units.

a comparison (step 85B) of the determined position with a digital site plan 25 of a manufacturing plant, in which a deactivation zone is defined.

an output of the control signal for deactivating the localizing mode to the one of the mobile transceiver units upon detection of a positional transition of the one of the mobile transceiver units from outside a deactivation zone into the corresponding deactivation zone, or the control signal for activating the localizing mode to the one of the mobile transceiver units upon detection of a positional transition of the one of the mobile transceiver units from within the at least one deactivation zone out of the at least one deactivation zone.

In a further sequence of steps of the method, a digital operating schedule in which a deactivation time window is stored can be provided, and the control signal for deactivating the localizing mode is output to the corresponding mobile transceiver unit when the deactivation time window is entered.

In a further sequence of steps of the method, a state signal can be generated when a state of one of the mobile transceiver units is detected for which positioning of the one of the mobile transceiver units is not required, and the control signal for deactivating the localizing mode can be output to the one of the mobile transceiver units for which the state signal was generated.

The sensors and functions described above on a mobile transceiver unit can be activated or deactivated by the manufacturing control, for example.

Usually the electronics of the mobile unit are operated with a battery or rechargeable battery. A battery can be charged by means of contacts led to the outside or contactless, e.g., inductive charging. Both can be done in such a way that the mobile transceiver unit has a tightly enclosing housing to protect it from moisture and environmental influences. The mobile transceiver unit 15 may also have a device for charging the batteries that extracts energy from environmental influences, e.g., the so-called "energy harvesting" from temperature differences between the top and bottom of the unit, from rapid movements such as vibrations or shocks, or from existing electromagnetic waves (e.g., solar).

To ensure that the battery or accumulator is operated economically, the mobile transceiver unit can enter a standby mode in which it no longer sends an UWB signal and/or deactivates reception, for example. In some embodiments, it can leave the stand-by mode independently. For example, if it has been moved, it can transmit a new location to the manufacturing control.

In general, individual or multiple of the described sensors can be used individually or in combination for such control methods. The sensors for orientation and acceleration detection are particularly suitable for controlling such changes in operating mode.

In some embodiments, the mobile transceiver unit may have a housing made of one of the following materials or a combination of them: plastic, metal, and rubber. The housing may also have a resilient material such as rubber on its corners and/or edges to protect against damage. The latter can also be used to protect against slipping, e.g., during transport.

Depending on the application, active or inactive mobile units (mobile transceiver units) can be used in the location system. Active mobile units permanently communicate their position to the manufacturing control system cyclically at a desired repetition rate. In general, active, repeatedly (periodically) emitting transmitters are also called "beacons". In contrast, an inactive mobile unit temporarily does not participate in a location detection. This may be the case, for example, if the last presumed position of the mobile unit is known, the assigned workpiece is stored for a longer period of time, order processing is suspended, or longer idle times between processing operations are to be expected.

Sensors provided in the mobile unit such as an acceleration sensor, an orientation sensor, or a sound sensor can be used to monitor such conditions. In general, a change from the inactive to the active state can be triggered by (digital) signals or manual manipulation. Manual manipulation can be carried out, for example, by deliberately shaking the mobile unit (e.g., manual shaking) or by starting to transport the workpiece (transfer through a gate 29, see FIG. 4). For active mobile units, repetition rates can be defined specifically for each mobile unit. With sets of rules, reasonable behavior patterns can be defined for each mobile unit or the assigned workpiece or an object according to the context information. Context information can include, for example, a zone affiliation, recently passed spatial gates, an active processing operation, a current time window (day/night/ weekday), and a specific tag family.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An indoor location system for supporting a manufacturing control of process courses in an industrial manufacturing of workpieces in a manufacturing plant in which a group of objects are each independently movable within the manufacturing plant, the indoor location system comprising:
a plurality of mobile transceivers, each of the mobile transceivers including a position signal module configured to be operable in a localizing mode for determining a position of a selected mobile transceiver of the mobile transceivers, each of the mobile transceivers being spatially assignable to a corresponding object from the group of objects,
wherein the indoor location system is configured to:
determine the position of the selected mobile transceiver based at least on runtimes of electromagnetic signals between the mobile transceivers,
output a deactivation control signal for deactivating a localizing mode of a position signal module of at least one of the mobile transceivers when participation of the at least one mobile transceiver in position determination operations is not required, and
output an activation control signal for activating the localizing mode of the position signal module of the at least one of the mobile transceivers from a deactivated state when participation of the at least one of the mobile transceivers in a position determination operation is required, and
wherein the indoor location system is configured to:
access positions of the mobile transceivers and a digital site map of the manufacturing plant in which at least one deactivation zone is defined, and
output a control signal for deactivating a localizing mode of a position signal module of one of the mobile transceivers for which a position transition from outside the at least one deactivation zone into the at least one deactivation zone is detected.

2. The indoor location system of claim 1, wherein the position signal modules of the mobile transceivers are configured as part of a location system configured to operate in a range from 1 GHz to 200 GHz transmission and reception frequency, and
wherein at least one of the position signal modules is configured to perform at least one of:
receiving power from a power source of an associated mobile transceiver for operating the localizing mode, or
setting time delays between received signals and transmitted signals, and
wherein the at least one of the position signal modules includes at least one of:
a signal receiver, a signal transmitter, and an antenna system for receiving and radiating signals,
a signal processor configured to process the received signals and to cause signals to be emitted, or
the power source of the associated mobile transceiver.

3. The indoor location system of claim 1, in which the indoor location system includes low-energy system transmitters,
wherein each of the mobile transceivers comprises a low-energy system receiver configured for a lower energy requirement than a signal receiver of the position signal module of the mobile transceiver, and
wherein the low-energy system transmitters and the low-energy system receivers are configured as part of a communication system based on low-energy system radio technology.

4. The indoor location system of claim 1, wherein the indoor location system is configured to:
access a digital operational schedule of one of the mobile transceivers, at least one deactivation time window being stored in the digital operational schedule, and
output a control signal for deactivating a localizing mode of a positional signal module of the one of the mobile transceivers at a time of entering the at least one deactivation time window.

5. The indoor location system of claim 1, in which the indoor location system includes a power demand detection module having at least one transmitter for transmitting switching signals,
wherein one of the mobile transceivers comprises a power consumption control module,
wherein the power demand detection module is configured to:
evaluate at least one of position information or status information of the mobile transceivers with respect to a required activity of the mobile transceivers during a current phase of a processing plan, and
output a switching signal to the power consumption control module to cause generation of a control signal for deactivation of a localizing mode of a positional signal module of the one of the mobile transceivers or generation of a control signal for activation of the localizing mode of the positional signal module of the one of the mobile transceivers.

6. The indoor location system of claim 5, wherein each of the mobile transceivers comprises a respective receiver for receiving a corresponding switching signal, and
wherein the at least one transmitter and the respective receivers are configured as part of a communication system based on low-energy system radio technology.

7. The indoor location system of claim 1, wherein one of the mobile transceivers includes a sensor module configured to generate a state signal when a state of the one of the mobile transceivers is detected, in which a position determination of the one of the mobile transceivers is either not required or required, and
wherein the indoor location system is configured to, upon reception of the state signal, output one of
a control signal for deactivation of a localizing mode of the one of the mobile transceivers when the state signal indicates that the position determination of the one of the mobile transceivers is not required, and
a control signal for activation of the localizing mode of the one of the mobile transceivers when the state signal indicates that the position determination of the one of the mobile transceivers is required.

8. The indoor location system of claim 7, wherein the sensor module includes at least one of
an acceleration sensor, an orientation sensor,
a magnetic sensor,
a light-sensitive sensor,
a temperature-sensitive sensor,
a sound wave-sensitive sensor,
a barometer sensor, or
a sensor for detecting electrical or electromagnetic signals.

9. The indoor location system of claim 7, wherein the sensor module is configured to detect a spatially stationary idle state of the one of the mobile transceivers and to output the state signal after detection of the spatially stationary idle state, and
wherein the indoor location system is configured to output the control signal of deactivation after the reception of the state signal.

10. The indoor location system of claim 1, wherein the at least one of the mobile transceivers includes at least one module from a group of modules consisting of:
a Global Positioning System (GPS) module,
a load cell module,
a temperature sensor module,
a humidity sensor module,
a brightness sensor module,
a vibration sensor module,
a Hall sensor module for magnetic field measurement for workpiece identification,
an eddy current measuring module for workpiece identification,
a vital function sensor module,
a near field communication module,
a light signal module,
a smoke detector module, and
a display module.

11. The indoor location system of claim 1, wherein the at least one of the mobile transceivers includes at least one module from a group of modules, and
wherein the indoor location system is configured to output a control signal for deactivating or activating a module of the group of modules.

12. The indoor location system of claim 1, wherein one of the mobile transceivers is spatially fixedly associated with a corresponding object of the group of objects assigned to the one of the mobile transceivers, and wherein at least some of the objects are of the group consisting of
workpieces,
workpiece transport devices, and
tools.

13. The indoor location system of claim 1, wherein one of the mobile transceivers includes a display adapted to display at least one of
information of a corresponding object assigned to the one of the mobile transceivers, or
a position of the one of the mobile transceivers in a site plan of the manufacturing plant.

14. The indoor location system of claim 1, in which the indoor location system includes at least one transmitter, and each of the mobile transceivers comprises a respective receiver,
wherein the at least one transmitter and the respective receivers are configured as part of a communication system based on Bluetooth Low Energy (BLE) radio technology, and
wherein the position signal modules of the mobile transceivers are configured as part of a location system based on Ultra Wide Band (UWB) technology.

15. The indoor location system of claim 1, in which the indoor location system includes at least one stationary transceiver configured to communicate wirelessly with each of the plurality of mobile transceivers with the independently movable objects in different positions within the manufacturing plant,
wherein the stationary transceiver is fixed on an object configured not to be moved within the manufacturing plant, and a position of the stationary transceiver is stored in a digital site plan of the manufacturing plant.

16. The indoor location system of claim 1, in which the indoor location system comprises a stationary analyzer having a power demand detection module that includes at least one transmitter for transmitting switching signals.

17. A manufacturing control system for controlling manufacturing processes in a manufacturing plant in which a group of objects are each independently movable within the manufacturing plant, the manufacturing control system comprising:
an indoor location system comprising:
a plurality of mobile transceivers, each of the mobile transceivers including a position signal module configured to be operable in a localizing mode for determining a position of a selected mobile transceiver of the mobile transceivers, each of the mobile transceivers being spatially assignable to a corresponding object from the group of objects,
wherein the indoor location system is configured to:
determine the position of the selected mobile transceiver based at least on runtimes of electromagnetic signals between the mobile transceivers,
output a deactivation control signal for deactivating a localizing mode of a position signal module of at least one of the mobile transceivers when participation of the at least one of the mobile transceivers in position determination operations is not required, and
output an activation control signal for activating the localizing mode of the position signal module of the at least one of the mobile transceivers from a deactivated state when participation of the at least one of the mobile transceivers in a position determination operation is required; and
a manufacturing execution system configured to assign the position of the selected mobile transceiver to a corresponding object assigned to the selected mobile transceiver and to include the position of the selected mobile transceiver in the manufacturing control system,
wherein the indoor location system is configured to perform the position determination operations and control an operation of the selected mobile transceiver, and
wherein the indoor location system is configured to:
access positions of the mobile transceivers and a digital site map of the manufacturing plant in which at least one deactivation zone is defined, and
output a control signal for deactivating a localizing mode of a position signal module of one of the mobile transceivers for which a position transition from outside the at least one deactivation zone into the at least one deactivation zone is detected.

18. A method of a manufacturing control of process courses in an industrial processing of workpieces in a manufacturing plant in which a group of objects are each independently movable within the manufacturing plant, the method comprising:

providing a plurality of mobile transceivers, wherein each of the mobile transceivers includes a position signal module operable in a localizing mode for determining a position of a selected mobile transceiver of the mobile transceivers, each of the mobile transceivers being spatially assignable to a corresponding object from the group of objects;

deactivating a localizing mode of a position signal module of at least one of the mobile transceivers when participation of the at least one of the mobile transceivers in position determination operations is not required;

after the deactivating, activating the localizing mode of the position signal module of the at least one of the mobile transceivers from a deactivated state when participation of the at least one of the mobile transceivers in a position determination operation is required;

for one of the mobile transceivers, providing a digital operational schedule in which at least one deactivation time window is stored; and outputting a control signal for deactivating a localizing mode of a position signal module of the one of the mobile transceivers at a time of entering the deactivation time window.

19. The method of claim 18, comprising:

performing a corresponding position determination operation in which the position of the selected mobile transceiver is determined from runtimes of electromagnetic signals between the mobile transceivers;

comparing the determined position of the selected mobile transceiver with a digital site plan of the manufacturing plant, in which at least one deactivation zone is defined; and outputting one of:
  a control signal for deactivating a localizing mode of a position signal module of one of the mobile transceivers upon detection of a position transition of the one of the mobile transceivers from outside the at least one deactivation zone into the at least one deactivation zone, and
  a control signal for activating the localizing mode of the position signal module of the one of the mobile transceivers upon detection of a position transition of the one of the mobile transceivers from within the at least one deactivation zone out of the at least one deactivation zone.

20. The method of claim 18, comprising:

generating a state signal when a state of one of the mobile transceivers is detected in which a position determination of the one of the mobile transceivers is not required, and outputting a control signal for deactivating a localizing mode of a position locating module of the one of the mobile transceivers for which the state signal has been generated.

21. An indoor location system for supporting a manufacturing control of process courses in an industrial manufacturing of workpieces in a manufacturing plant in which a group of objects are each independently movable within the manufacturing plant, the indoor location system comprising:

a plurality of mobile transceivers, each of the mobile transceivers including a position signal module configured to be operable in a localizing mode for determining a position of a selected mobile transceiver of the mobile transceivers, each of the mobile transceivers being spatially assignable to a corresponding object from the group of objects, wherein the indoor location system is configured to:
  determine the position of the selected mobile transceiver based at least on runtimes of electromagnetic signals between the mobile transceivers,
  output a deactivation control signal for deactivating a localizing mode of a position signal module of at least one of the mobile transceivers when participation of the at least one mobile transceiver in position determination operations is not required, and
  output an activation control signal for activating the localizing mode of the position signal module of the at least one of the mobile transceivers from a deactivated state when participation of the at least one of the mobile transceivers in a position determination operation is required, and wherein the indoor location system is configured to:
  access a digital operational schedule of one of the mobile transceivers, at least one deactivation time window being stored in the digital operational schedule, and
  output a control signal for deactivating a localizing mode of a positional signal module of the one of the mobile transceivers at a time of entering the at least one deactivation time window.

22. A method of a manufacturing control of process courses in an industrial processing of workpieces in a manufacturing plant in which a group of objects are each independently movable within the manufacturing plant, the method comprising:

providing a plurality of mobile transceivers, wherein each of the mobile transceivers includes a position signal module operable in a localizing mode for determining a position of a selected mobile transceiver of the mobile transceivers, each of the mobile transceivers being spatially assignable to a corresponding object from the group of objects;

deactivating a localizing mode of a position signal module of at least one of the mobile transceivers when participation of the at least one of the mobile transceivers in position determination operations is not required;

after the deactivating, activating the localizing mode of the position signal module of the at least one of the mobile transceivers from a deactivated state when participation of the at least one of the mobile transceivers in a position determination operation is required;

performing a corresponding position determination operation in which the position of the selected mobile transceiver is determined from runtimes of electromagnetic signals between the mobile transceivers;

comparing the determined position of the selected mobile transceiver with a digital site plan of the manufacturing plant, in which at least one deactivation zone is defined; and outputting one of:
  a control signal for deactivating a localizing mode of a position signal module of one of the mobile transceivers upon detection of a position transition of the one of the mobile transceivers from outside the at least one deactivation zone into the at least one deactivation zone, or
  a control signal for activating the localizing mode of the position signal module of the one of the mobile transceivers upon detection of a position transition of the one of the mobile transceivers from within the at least one deactivation zone out of the at least one deactivation zone.

* * * * *